(12) United States Patent
Stanic (10) Patent No.: US 11,890,973 B2
(45) Date of Patent: Feb. 6, 2024

(54) GEARING ARRANGEMENT FOR A SPINDLE DRIVE ARRANGEMENT, SPINDLE DRIVE ARRANGEMENT, AND VEHICLE SEAT

(71) Applicant: ADIENT US LLC, Plymouth, MI (US)

(72) Inventor: Ivica Stanic, Dormagen (DE)

(73) Assignee: Adient US LLC, Plymouth, MI (US)

( * ) Notice: Subject to any disclaimer, the term of this patent is extended or adjusted under 35 U.S.C. 154(b) by 64 days.

(21) Appl. No.: 17/761,234

(22) PCT Filed: Oct. 26, 2020

(86) PCT No.: PCT/EP2020/079985
§ 371 (c)(1),
(2) Date: Mar. 17, 2022

(87) PCT Pub. No.: WO2021/083817
PCT Pub. Date: May 6, 2021

(65) Prior Publication Data
US 2022/0363164 A1  Nov. 17, 2022

(30) Foreign Application Priority Data

Nov. 1, 2019  (DE) .................. 10 2019 216 902.3
Mar. 24, 2020  (DE) .................. 10 2020 108 069.7

(51) Int. Cl.
*B60N 2/16* (2006.01)
*B60N 2/02* (2006.01)

(52) U.S. Cl.
CPC .......... *B60N 2/166* (2013.01); *B60N 2/02246* (2023.08); *B60N 2/02253* (2023.08); *B60N 2/02258* (2023.08)

(58) Field of Classification Search
CPC .................. B60N 2/166; B60N 2/0232; B60N 2002/0236; B60N 2002/024; F16H 20/25
See application file for complete search history.

(56) References Cited

U.S. PATENT DOCUMENTS

| | | | | |
|---|---|---|---|---|
| 2007/0108360 A1* | 5/2007 | Ito | ............ | B60N 2/067 248/424 |
| 2017/0008423 A1* | 1/2017 | Stanic | ............ | B60N 2/929 |
| 2020/0047646 A1* | 2/2020 | Stanic | ............ | B60N 2/232 |

FOREIGN PATENT DOCUMENTS

| | | |
|---|---|---|
| DE | 29924108 U1 | 5/2002 |
| DE | 102018204195 A1 * | 9/2019 |
| DE | 102018204195 A1 | 9/2019 |
| EP | 3523160 A1 | 8/2019 |

OTHER PUBLICATIONS

German patent and Trademark Office, Office Action in application No. 10 2020 108 069.7, dated Feb. 7, 2023, 5 pages.
PCT International Search Report and Written Opinion (PCT/EP2020/079985).

* cited by examiner

*Primary Examiner* — Zakaria Elahmadi
(74) *Attorney, Agent, or Firm* — Marshall & Melhorn, LLC (57) ABSTRACT

A gearing arrangement for a spindle drive arrangement may have a gearing housing and a gearing holder. The gearing holder may have at least two receiving openings, one for each fastening screw or one for each fastening bolt for fastening to another component, in particular to a vehicle seat. The at least two receiving openings may be oriented at right-angles and/or obliquely with respect to one another. A spindle drive arrangement having such a gearing arrangement, and also to a vehicle seat having such a spindle drive arrangement is also provided.

14 Claims, 5 Drawing Sheets

GEARING ARRANGEMENT FOR A SPINDLE DRIVE ARRANGEMENT, SPINDLE DRIVE ARRANGEMENT, AND VEHICLE SEAT

FIELD

The invention relates to a gear arrangement for a spindle drive arrangement, to a spindle drive arrangement and to a vehicle seat.

PRIOR ART

Background

Spindle drive arrangements are well known from the prior art, for example for an adjusting mechanism of a vehicle which is used, for example, for an electrical height adjustment of the vehicle seat. Spindle drive arrangements of this type comprise an electric motor and the gear arrangement, by which a rotational movement of the electric motor is transmitted to a threaded spindle of the spindle drive arrangement. The spindle drive arrangement makes it possible for a rotational movement of the electric motor to be converted via the gear arrangement into a translational movement.

SUMMARY

Problem

It is a problem of the present invention to specify a gear arrangement, which is improved with respect to the prior art, for a spindle drive arrangement, a spindle drive arrangement which is improved with respect to the prior art, and a vehicle seat which is improved with respect to the prior art.

According to the invention, the problem is solved by way of a gear arrangement for a spindle drive arrangement, which gear arrangement comprises at least a gear housing and a gear holder as components. The gear holder advantageously has at least two receiving openings for in each case one fastening screw or in each case one fastening pin for fastening to another component, in particular to a vehicle seat, these at least two receiving openings advantageously being oriented at a right angle and/or obliquely with respect to one another, that is to say, in particular, not being oriented parallel to one another, but being oriented with respect to one another, in particular, at an angle which can be greater than 0° and up to 90°, in particular is 90°. Two groups of receiving openings of this type are advantageously provided, that is to say the receiving openings of the one group are advantageously oriented at a right angle and/or obliquely with respect to receiving openings of the other group, in particular are not oriented in parallel, but, in particular, are oriented with respect to one another at an angle which is greater than 0° and can be up to 90°, in particular is 90°. As a result, it is made possible for the gear holder to be fastened to the other component, in particular to the vehicle seat, in two different orientations, for example oriented either horizontally or vertically. Therefore, this gear holder can be used, for example, for different variants of vehicle seats and/or for different variants of the spindle drive arrangement which differ, for example, in terms of the respective used electric motor for the spindle drive arrangement and/or in terms of a respective used threaded spindle for the spindle drive arrangement. Therefore, separately and specifically configured gear holders are not required for each of these variants of the spindle drive arrangement and/or for each of these variants of the vehicle seat.

The two abovementioned components of the gear arrangement, that is to say the gear housing and the gear holder, advantageously have corresponding connecting elements for connecting the gear housing to the gear holder. Here, the connecting elements of the one component, for example of the gear housing or of the gear holder, are configured in each case as a pin, and the connecting elements of the other component, for example of the gear holder or the gear housing, are configured in each case as a receiving pocket for receiving in each case one of the pins. The receiving pockets in each case have an insertion opening and a mounting opening. The pins are in each case configured in such a way that, in a mounting orientation of the gear housing with respect to the gear holder, they can be inserted through the respective insertion opening and into the respective mounting opening and can be rotated in the mounting opening, an insertion of the respective pin through the respective insertion opening being blocked in the case of an orientation, differing from the mounting orientation, of the gear housing with respect to the gear holder, in particular in the case of at least one operating orientation of the gear housing. The operating orientation is an orientation which differs from the mounting orientation. A plurality of operating orientations of this type can be provided as a result of the pivotable mounting of the gear housing on the gear holder. These operating orientations result, in particular, by way of an adjustment of a component, in particular of the vehicle seat, which can be adjusted by the spindle drive arrangement, for example by way of a height adjustment of the vehicle seat. This correspondingly results in a plurality of operating orientations from a maximum adjustment position to an opposite maximum adjustment position, for example from a lowest to highest position of the height-adjustable vehicle seat. Here, the mounting orientation is expediently not reached, with the result that undesired dismantling of the gear holder and the gear housing during this adjustment is ruled out.

The respective insertion opening is, in particular, of slot-shaped configuration. The respective mounting opening is, in particular, of round configuration, that is to say it has a round cross section. The respective pin is, in particular, of web-shaped configuration. It has, in particular, a non-round cross section, for example an oval, elliptical or rectangular cross section, advantageously with rounded corners. In particular, the respective pin is configured in such a way that a length of its cross section is greater than the width of its cross section. Here, the width of the cross section of the respective pin is smaller than a width of the respective insertion opening, and the length of the cross section of the respective pin is greater than the width of the respective insertion opening and corresponds, in particular, to a diameter of the respective mounting opening. As a result, the above-described situation is achieved, namely that, in the mounting orientation of the gear housing with respect to the gear holder, the pins can be inserted through the respective insertion opening and into the respective mounting opening and can be rotated on the mounting opening, an insertion of the respective pin through the respective insertion opening being blocked in the case of an orientation, differing from the mounting orientation, of the gear housing with respect to the gear holder.

Mounting of the gear housing such that it can be rotated relative to the gear holder is achieved by way of the pins, in particular by way of their length of the cross section, which length corresponds to the diameter of the respective bearing opening, the bolts which are arranged in the mounting openings of the receiving pockets forming a rotational axis of the gear housing and therefore also of the spindle drive of the spindle drive arrangement.

The gear housing advantageously comprises a gear cover. An outer side of the gear cover bears against the gear holder and slides along on the gear holder during rotational movements of the gear housing relative to the gear holder in that state of the gear housing and the gear holder, in which they are connected to one another, and in the case of an orientation, differing from the mounting orientation, of the gear housing with respect to the gear holder. As a result, no fixed connection between the gear housing and the gear cover is necessary in the direction of the spindle axis of the threaded spindle, since the gear cover is supported directly on the gear holder and is held by the latter in its position in the gear housing. In particular, operating loads and loads which occur in the case of vehicle collisions are dissipated as a result from the threaded spindle via a worm gear of a gear, comprising the gear housing, and the gear cover directly into the gear holder, without loading the gear housing. As a result, in particular, the connecting elements are relieved, since they are not incorporated into the described load path. As a result, they have less wear and can be of smaller dimensions. For example, they can be configured from plastic.

In the case of the gear arrangement which is described here, the gear holder, in particular in at least one operating orientation of the gear housing with respect to the gear holder, is advantageously arranged laterally next to the gear housing, in particular is arranged laterally next to the gear housing in the axial direction of the threaded spindle, in particular exclusively in this axial direction of the threaded spindle. That is to say, the gear holder is not surrounded on the peripheral side by the gear housing, but rather the gear holder and the gear housing are arranged laterally next to one another. In particular, the gear holder is arranged in the region of that side of the gear housing, on which one end of the threaded spindle protrudes out, in particular through the gear cover, on which end an end stop sleeve is arranged. In particular, the gear holder is arranged on a side of the gear housing, which side faces away from that end of the threaded spindle, on which a fastening element is arranged. By this fastening element, the threaded spindle is to be connected or is connected to a component which is to be adjusted, in particular, by the spindle drive arrangement, in particular by the spindle drive, in particular in a vehicle seat. This connection is therefore not impeded by the gear holder, since the latter is arranged on the other side of the gear housing.

In particular, the connecting elements of the gear housing and the connecting elements of the gear holder are arranged in each case laterally next to the threaded spindle, in particular in at least one operating orientation of the gear housing with respect to the gear holder, in particular are arranged laterally next to the threaded spindle in the radial direction of the threaded spindle. Therefore, in each case one connecting element pair consisting of a connecting element of the gear housing and a connecting element of the gear holder are arranged laterally next to the threaded spindle in the described way, with the result that the threaded spindle is arranged between these two connecting element pairs. In this way, it can move freely, in particular in its axial direction, and is not impeded by way of the connecting elements and the gear holder.

The connecting elements are configured in each case as brackets, legs or arms on the gear holder and gear housing, the connecting elements which are configured in such a way on the gear housing being spaced apart laterally from one another and, expediently in a manner which corresponds to this, the connecting elements which are configured in such a way on the gear holder also being spaced apart laterally from one another, with the result that a clearance for arranging the threaded spindle is produced in between.

The connecting elements of the gear housing are configured for example, in particular on both sides, on brackets of the gear housing, in particular on both sides on the respective bracket, that is to say are configured so as to protrude from an inner side, which faces the respective other bracket, and from an outer side, which faces away from the respective other bracket, of the respective bracket. At least substantially, the two brackets are oriented parallel to one another and are spaced apart from one another, with the result that there is a clearance of the threaded spindle in between.

The gear holder is, in particular, of double-walled configuration in the region of its connecting elements which are advantageously configured as receiving pockets, with the result that the brackets can be arranged or are arranged between the respective outer wall and inner wall of the gear holder. As a result, the gear housing and the gear holder are fixed laterally with respect to one another, for example without play or with a predefined, in particular small, play, and lateral unlatching of the connecting elements, for example in the case of a lateral action of force, is prevented, in particular.

The gear arrangement advantageously comprises not only the gear holder and the gear housing, but rather the entire gear, that is to say also gear components which are arranged in the gear housing, in particular the worm gear and bearing plates.

Furthermore, according to the invention, the problem is solved by way of a spindle drive arrangement which comprises the described gear arrangement. Furthermore, this spindle drive arrangement advantageously comprises an electric motor and/or the threaded spindle.

Furthermore, according to the invention, the problem is solved by way of a vehicle seat which comprises at least the gear holder of the described gear arrangement. The vehicle seat advantageously comprises the described gear arrangement, and preferably the described spindle drive arrangement.

The advantages which are achieved by way of the invention consists, in particular, in that it is made possible for the gear to be manufactured as a core standard unit, by the gear housing being fitted with all the required gear components, in particular with the worm gear and the bearing plates, and being closed by way of arrangement of the gear cover on the gear housing, in particular by way of it being pressed into the gear housing. Subsequently, in accordance with respective requirements, a respective variant of the electric motor and a respective variant of the threaded spindle can be coupled to the gear. As a result, a spindle drive which is adapted to the respective requirements can be configured by way of this core standard unit. Subsequently, this spindle drive is connected to the gear carrier, by the gear housing being connected to the gear carrier in the above-described way. Here, the gear carrier can already be fastened to the other component, in particular to the vehicle seat, or can be fastened to this other component, in particular to the vehicle seat, only subsequently, that is to say when the spindle drive is already connected. As a result of the receiving openings with a different orientation for the fastening screws or fastening pins, the gear carrier and, via this, the spindle drive can be fastened in a respective required orientation to the respective variant of the vehicle seat, for example oriented in the y-direction or z-direction of the vehicle seat.

As an alternative to this connecting of the gear to the gear carrier only after the coupling of the gear to the electric motor and the threaded spindle, a core standard preassembled group consisting of the gear and the gear carrier can first of all be configured, for example, by the gear first of all being manufactured as a core standard unit in the above-described way by the gear housing being fitted with all required gear components, in particular with the worm gear and the bearing plates, and being closed by way of arranging of the gear cover on the gear housing, in particular by way of pressing it into the gear housing, and by this gear subsequently being connected to the gear carrier in the described way. This core standard preassembled group is identical for all variants and, depending on the requirements of the respective variant, can then be coupled to a respective variant of the electric motor and a respective variant of the threaded spindle and, before or after this coupling to the electric motor and the threaded spindle, can be fastened by the gear carrier to the other component, in particular to the vehicle seat.

The solution according to the invention achieves, in particular, a simplification of the assembly, a reduction of the number of parts, a cost reduction and variant flexibility.

Furthermore, in particular in comparison with the gear holder which encloses the gear housing in a cage-shaped manner, a reduction of noise is achieved, in particular, by way of the described configuration of the gear holder and the gear housing, and, in particular, a reduction in stopping noise when an end stop of the spindle drive is reached and a reduction in noise generated by way of the effects of a load change. Furthermore, a performance capability over a life cycle, a freedom from play and a capability to handle end stops of the spindle drive are improved. As a result of the described rotatable mounting of the gear housing with regard to the gear holder, in addition, a greater rotary angle and, as a result, for example a greater seat height adjustment of the vehicle seat are made possible. Furthermore, collision safety is improved, in particular, as a result of the dissipation of loads which occur in the case of vehicle collisions via the gear cover directly into the gear holder and the relieving, achieved as a result, of the connecting elements.

BRIEF DESCRIPTION OF THE FIGURES

In the following text, the invention is described in greater detail on the basis of gear arrangements which are shown in FIGS. 1 and 2 and are known from the prior art and on the basis of one advantageous exemplary embodiment which is shown in FIGS. 3 to 9. The invention is not restricted to this exemplary embodiment, however. In the figures.

Parts which correspond to one another are provided with the same designations in all the figures.

DETAILED DESCRIPTION

On the basis of FIGS. 1 to 9, the following text describes a spindle drive arrangement 1 which is provided, for example, for an adjustment mechanism of a vehicle (not shown here), for example for an electric height adjustment means of a vehicle seat (not shown here) of the vehicle.

The spindle drive arrangement 1 comprises a gear arrangement 2, an electric motor 3 and a threaded spindle 4. The gear arrangement 2 comprises a gear 5 which comprises a gear housing 6 with a gear cover 7 and gear components which are arranged in the gear housing 6, in particular a worm gear and bearing plates, and a gear holder 8 for fastening the spindle drive arrangement 1 to another component, in particular to the vehicle seat. The gear 5, the threaded spindle 4 and the electric motor 3 form a spindle drive 9 of the spindle drive arrangement 1.

The electric motor 3 is coupled to the threaded spindle 4 via the gear 5, in particular via its worm gear. A rotational movement of the electric motor 3 can be transmitted to the threaded spindle 4 via the gear 5, expediently via its worm gear. The spindle drive arrangement 1 therefore makes it possible for a rotational movement of the electric motor 3 to be converted via the gear 5 into a translational movement of the threaded spindle 4.

If the spindle drive arrangement 1 is used for the height adjustment of the vehicle seat, the spindle drive arrangement 1 is expediently fastened by the gear holder 8 to a part of the vehicle seat, and one end of the threaded spindle 4 is fastened to a part, movable relative thereto, of the vehicle seat, for example to in each case one frame part of the vehicle seat. To this end, this end of the threaded spindle 4 expediently has a fastening element 10 which is configured, for example, in the form of a fastening eye. In order to prevent the other end of the threaded spindle 4 from being screwed out of the gear 5, an end stop sleeve 11 is additionally provided.

It is provided in the exemplary embodiments which are shown here that the threaded spindle 4 is configured as a non-rotating threaded spindle 4, that is to say the gear 5 acts on a thread 12 of the threaded spindle 4 on account of a rotational movement of the electric motor 3, expediently via the worm gear, in such a way that this thread 12 performs a translational movement in the direction of its longitudinal axis, the threaded spindle 4 not rotating about its longitudinal axis. Here, a rotational movement of the electric motor 3 in one rotational direction leads to a translational movement of the threaded spindle 4 in one rotation, and a rotational movement of the electric motor 3 in the opposite rotational direction leads to a corresponding translational movement of the threaded spindle 4 in the opposite direction, that is to say the threaded spindle 4 moves forward or backward, depending on the rotational direction of the electric motor 3. A corresponding coupling to the vehicle seat results in a corresponding height change of the vehicle seat, in the case of the use of the spindle drive arrangement 1 in an adjustment mechanism for the electric height adjustment of the vehicle seat.

It is provided in the case of an adjustment mechanism of this type for the spindle drive arrangement 1 to be mounted on the vehicle seat in such a way that the spindle drive 9 is mounted such that it can be rotated and/or pivoted about a rotational axis A, expediently on the vehicle seat and/or on a frame of the vehicle seat, via which frame the vehicle seat is fastened or can be fastened to the vehicle, and which frame is expediently a constituent part of the adjustment mechanism. The pivoting and/or rotational movement of the spindle drive 9 results from the height change of the vehicle seat and therefore of that end of the threaded spindle 4 which is arranged on it, while the spindle drive 9 is mounted via the rotational axis A on that part of the vehicle seat, expediently of the frame, which does not participate in this height change or performs it to a different extent. A reversed arrangement of the end of the threaded spindle 4 and the spindle drive 9 via the rotational axis A is also possible. The rotational axis A (also called axis of rotation or pivot axis) is expediently oriented parallel to a y-axis of the vehicle, that is to say parallel to a transverse axis of the vehicle, in the case of a vehicle seat which is arranged in the vehicle and is oriented in the direction of travel or counter to the direction of travel.

Figure 1:
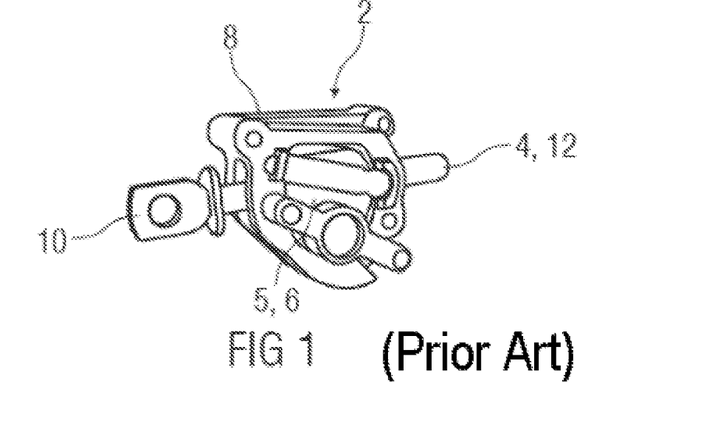
FIG. 1 diagrammatically shows a perspective illustration of a gear arrangement for a spindle drive arrangement according to the prior art, FIG. 2 diagrammatically shows an outline view of a plurality of gear holders which are known from the prior art and of spindle drive arrangements which are configured with them, in comparison with the gear holder which is improved in contrast, FIG. 3 diagrammatically shows an assembly step for the assembly of a gear arrangement for a spindle drive arrangement, FIG. 4 diagrammatically shows a further assembly step for the assembly of a gear arrangement for a spindle drive arrangement, FIG. 5 diagrammatically shows a further assembly step for the assembly of a gear arrangement for a spindle drive arrangement, FIG. 6 diagrammatically shows a perspective illustration of a gear arrangement for a spindle drive arrangement, FIG. 7 diagrammatically shows a partially exploded illustration of a spindle drive arrangement, FIG. 8 diagrammatically shows a perspective illustration of a gear arrangement with a threaded spindle arranged therein for a spindle drive arrangement, and FIG. 9 diagrammatically shows a perspective illustration of a spindle drive arrangement.

The gear arrangement 2 which is shown in FIG. 1 and is known from the prior art is configured as a gear arrangement 2 for what is known as a cage-type spindle drive arrangement. The gear holder 8 is configured as a cage for securing the gear 5 and its gear housing 6. Moreover, the gear holder 8 is used for securing the spindle drive 9 and therefore the entire spindle drive arrangement 1 on the vehicle seat.

Figure 2:
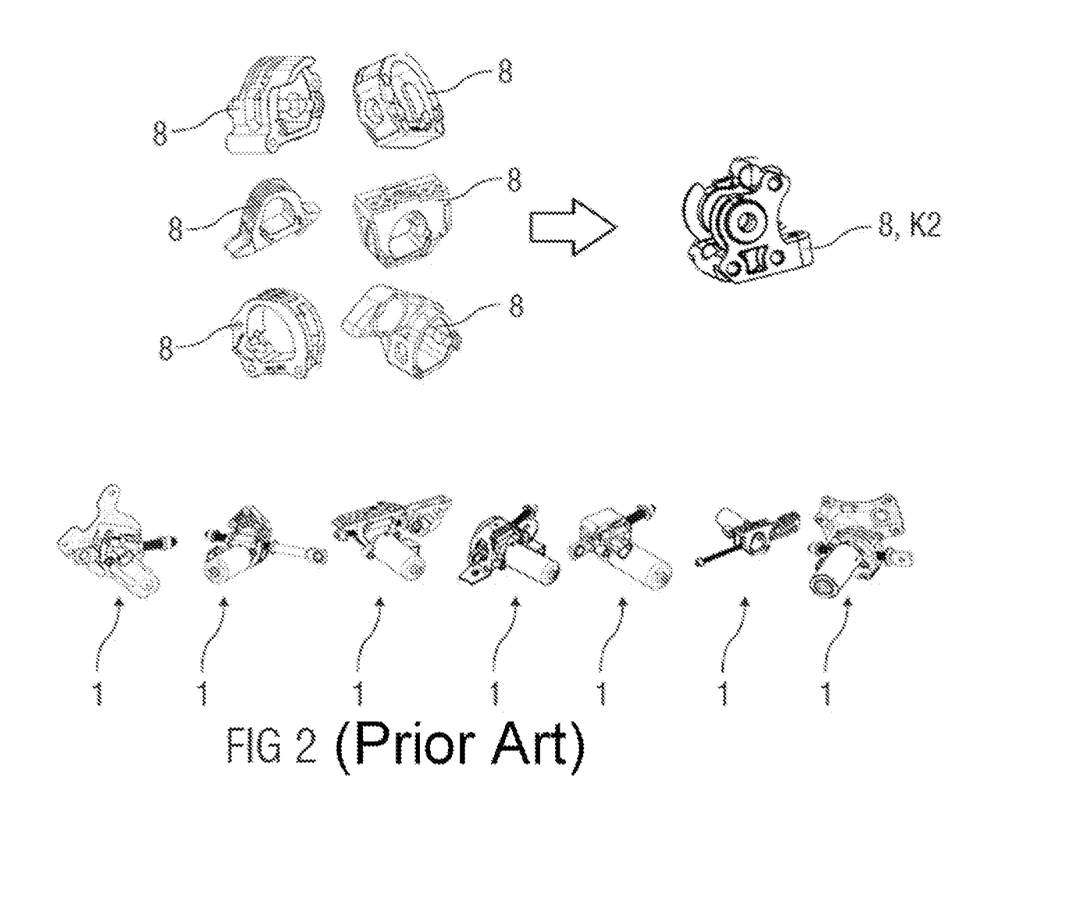

It is a disadvantage here that a corresponding variety of variants of gear holders 8, as shown by way of example in FIG. 2, are required in the case of different variants of vehicle seats and in the case of different variants of electric motors 3 and threaded spindles 4, it being possible for these variants to require, for example, fastening of the spindle drive arrangement 1 to the vehicle seat in different orientations.

The left-hand side of FIG. 2 shows six different variant examples of gear holders 8. The bottom of FIG. 2 shows a variety of variants of spindle drive arrangements 1, for which the different gear holders 8 are required in the prior art. The solution which is described in the following text makes it possible for the variety of variants with regard to the gear holders 8 to be avoided and for it to be possible for a single variant of the gear holder 8 (shown on the right in FIG. 2 by way of example) to be used for the different variants of the spindle drive arrangement 1.

In order to make this possible, the gear holder 8 of the gear arrangement 2 which is shown in greater detail in FIGS. 3 to 9 has at least two receiving openings 13 for in each case one fastening screw or in each case one fastening pin for fastening to another component, in particular to the vehicle seat, these at least two receiving openings 13 advantageously being oriented at a right angle and/or obliquely with respect to one another, that is to say, in particular, not being oriented parallel to one another, but rather being oriented at an angle with respect to one another, which angle is greater than 0° and can be up to 90°, in particular is 90°.

In the example which is shown, two groups of receiving openings 13 of this type are provided, that is to say the receiving openings 13 of the one group are advantageously oriented at a right angle and/or obliquely with respect to the receiving openings 13 of the other group, that is to say, in particular, are not oriented in parallel but rather, in particular, at an angle with respect to one another, which angle is greater than 0° and can be up to 90°, in particular is 90°. In the example which is shown, this angle is 90°, that is to say the receiving openings 13 of the one group are oriented at a right angle with respect to the receiving openings 13 of the other group.

As a result, it is made possible for the gear holder 8 to be fastened to the other component, in particular to the vehicle seat, in two different orientations, for example oriented either horizontally or vertically. Therefore, this gear holder 8 can be used for different variants of vehicle seats and/or for different variants of the spindle drive arrangement 1 which differ, for example, in terms of a respective used electric motor 3 for the spindle drive arrangement 1 and/or in terms a respective used threaded spindle 4 for the spindle drive arrangement 1. Therefore, gear holders 8 of separate and specific configuration are not required for each of these variants of the spindle drive arrangement 1 and/or for each of these variants of the vehicle seat.

As components K1, K2, the gear arrangement 2 comprises at least the gear housing 6 and the gear holder 8. These two components K1, K2 have corresponding connecting elements V1, V2 for connecting the gear housing 6 to the gear holder 8. In the example which is shown, the connecting elements V1 of the gear housing 6 which is configured as first component K1 are configured in each case as a pin 14, and the connecting elements V2 of the gear holder 8 which is configured as second component K2 are configured in each case as a receiving pocket 15 for receiving in each case one of the pins 14. This can also be reversed in other exemplary embodiments.

The receiving pockets 15 in each case have an insertion opening 16 and a mounting opening 17. The first connecting elements V1 which are configured as pins 14 and are configured here so as to project laterally on the gear housing 6 which is configured as first component K1 are configured in each case in such a way that, in a mounting orientation of the gear housing 6 with respect to the gear holder 8, they can be inserted through the respective insertion opening 16 and into the respective mounting opening 17, as FIGS. 3 and 4 show in two consecutive assembly steps of the assembly of the gear housing 6, in particular of the gear 5, on the gear holder 8, and can be rotated in the mounting opening 17, leading through of the respective pin 14 through the respective insertion opening 16 being blocked (as shown in FIG. 5) in the case of an orientation of the gear housing 6, in particular of the gear 5, with respect to the gear holder 8, which orientation differs from the mounting orientation, in particular in the case of at least one operating orientation of the gear housing 6, in particular of the gear 5.

Figure 3:
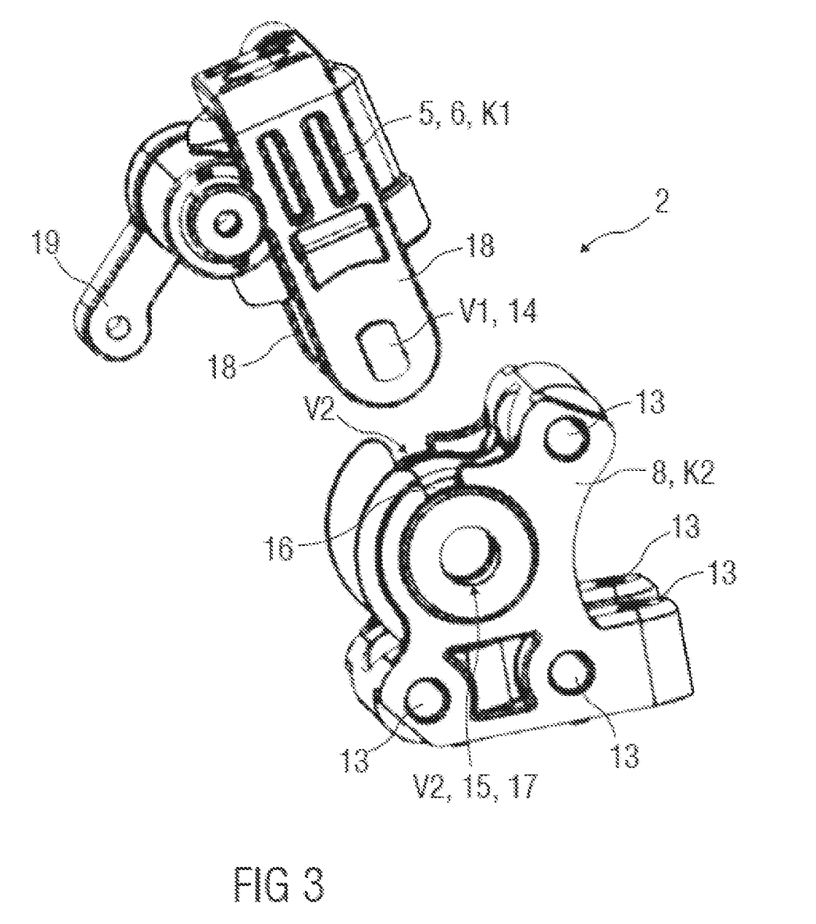
Figure 4:
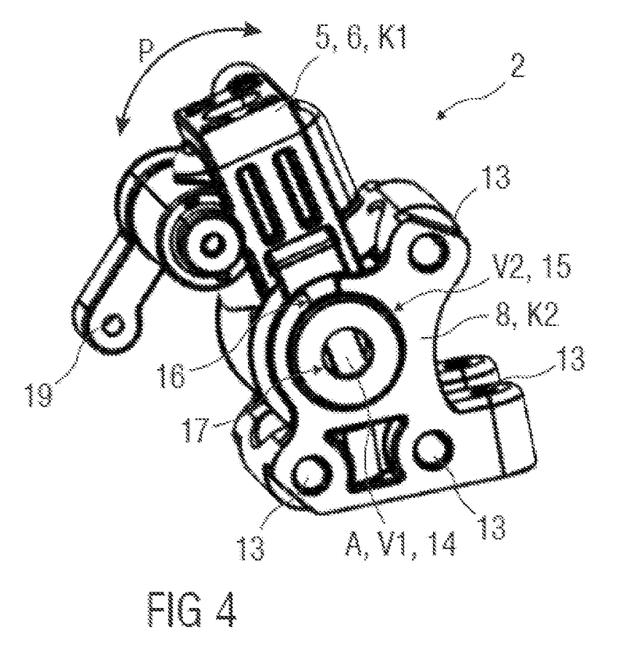
Figure 5:
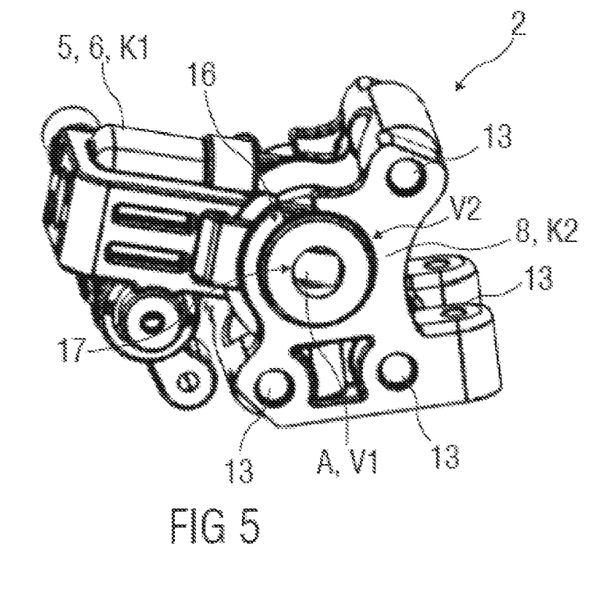
Figure 6:
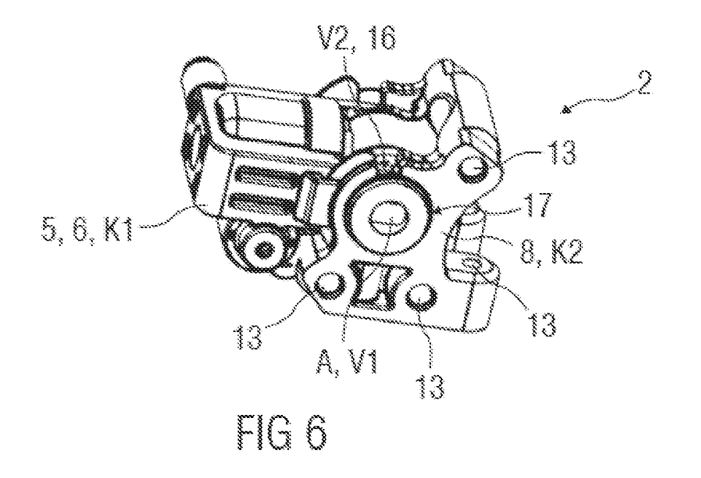
Figure 7:
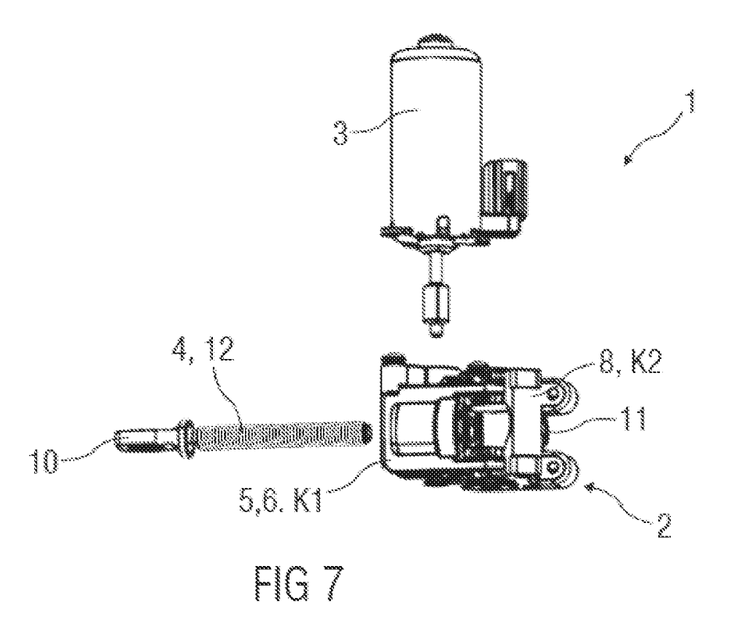
Figure 8:
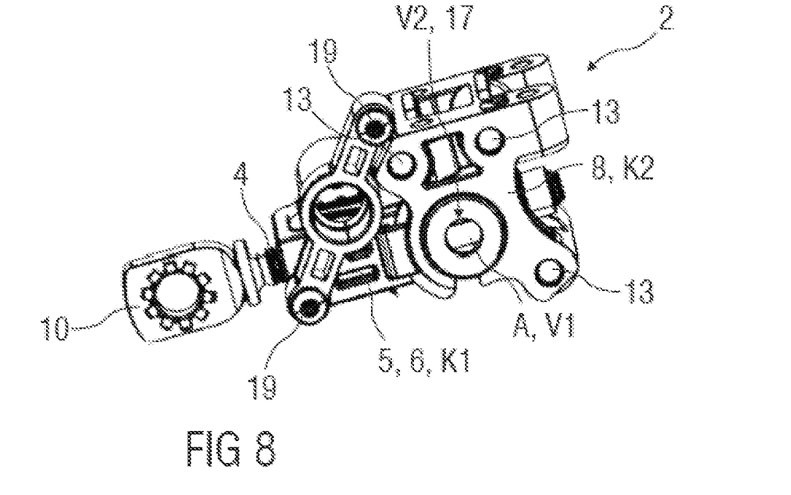

The connection of the gear housing 6 and therefore of the gear 5 to the gear holder 8 takes place by way of the assembly shown in FIGS. 3 to 5. The gear housing 6 and the gear holder 8 are first of all moved toward one another into the mounting orientation, as shown in FIG. 3. The pins 14 are then inserted into the receiving pockets 15, by being guided through the insertion opening 16 until they have arrived in the respective mounting opening 17, as shown in FIG. 4. Subsequently, the gear housing 6 and the gear holder 8 are rotated relative to one another about the rotational axis A, as shown in FIG. 4 on the basis of a pivoting arrow P. For example, the gear housing 6 is moved into the operating orientation, as shown in FIG. 5. Therefore, guiding of the respective pin 14 through the respective insertion opening 16 is blocked.

The respective insertion opening 16 is, in particular, of slot-shaped configuration. The respective mounting opening 17 is, in particular, of round configuration, that is to say it has a round cross section. The respective pin 14 is, in particular, of web-shaped configuration. It has, in particular, a non-round cross section, for example an oval, elliptical or rectangular cross section, advantageously with rounded corners. In particular, the respective pin 14 is configured in such a way that a length of its cross section is greater than the width of its cross section. Here, the width of the cross section of the respective pin 14 is smaller than a width of the respective insertion opening 16, and the length of the cross section of the respective pin 14 is greater than the width of the respective insertion opening 16, and advantageously corresponds with a diameter of the respective mounting opening 17. As a result, the above-described situation is achieved where, in the mounting orientation of the gear housing 6 with respect to the gear holder 8, the pins 14 can be inserted through the respective insertion opening 16 and into the respective mounting opening 17, and can be rotated in the mounting opening 17, guiding of the respective pin 14 through the respective insertion opening 16 being blocked in the case of an orientation of the gear housing 6 with respect to the gear holder 8, which orientation differs from the mounting orientation. Mounting of the gear housing 6 in a rotatable manner relative to the gear holder 8 is achieved by way of the pins 14, in particular by way of their length of their cross section, which length corresponds to the diameter of the respective mounting opening 17, the pins 14 which are arranged in the mounting openings 17 of the receiving pockets 15 forming the rotational axis A of the gear housing 6 and therefore also of the spindle drive 9 of the spindle drive arrangement 1.

In the example which is shown, the first connecting elements V1 which are configured as pins 14 are configured on both sides on brackets 18 of the gear housing 6 which is configured as first component K1, in particular on both sides on the respective bracket 18, that is to say are configured so as to protrude from an inner side, which faces the respective other bracket 18, and from an outer side, which faces away from the respective other bracket 18, of the respective bracket 18. The two brackets 18 are oriented at least substantially parallel to one another. The gear holder 8 which is configured as second component K2 is of double-walled configuration in the region of the receiving pockets 15 which are configured as second connecting elements V2, with the result that the brackets 18 can be arranged (as shown in FIG. 3) or are arranged (as shown in FIGS. 4 to 9) between the respective outer wall and inner wall of the gear holder 8. As a result, the gear housing 6 and the gear holder 8 are fixed laterally with respect to one another, for example without play or with a predefined, in particular small, play, and lateral unlatching of the connecting elements V1, V2, for example in the case of a lateral action of force, is prevented, in particular.

Figure 9:
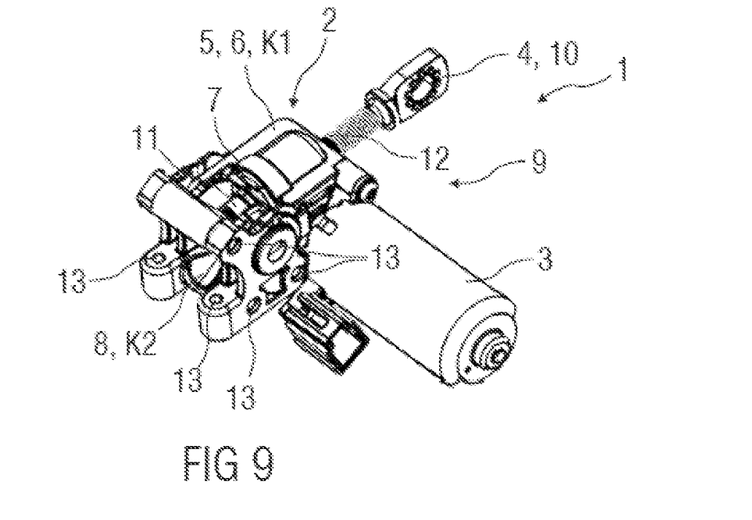

The gear housing 6 advantageously comprises the above-mentioned gear cover 7. In that state of the gear housing 6 and the gear holder 8, in which they are connected to one another, and in the case of an orientation of the gear housing 6 with respect to the gear holder 8, which orientation differs from the mounting orientation, an outer side of the gear cover 7 advantageously bears against the gear holder 8, as shown in FIG. 9, and slides along on the gear holder 8 during pivoting movements of the gear housing 6 relative to the gear holder 8. This is realized in the example which is shown by way of a rounded edge region of the inner wall of the gear holder 8 of double-walled configuration in the region of the receiving pockets 15, the gear cover 7 sliding along on these rounded edge regions of the two inner walls during pivoting movements of the gear housing 6 relative to the gear holder 8 about the rotational axis A, and therefore being held by way of these inner walls.

As a result, a fixed connection between the gear housing 6 and the gear cover 7 is not required in the direction of the spindle axis of the threaded spindle 4, in particular in the direction of the receiving pockets 15 and therefore of the inner walls of the gear holder 8, that is to say, in particular, away from the gear housing 6, since the gear cover 7 is supported directly on the gear holder 8 and is held by the latter in this position in the gear housing 6. It is therefore, for example, only pressed into the gear housing 6, but is not connected fixedly to the latter. In particular, operating loads and loads which occur in the case of vehicle collisions are dissipated as a result from the threaded spindle 4 via the worm gear of the gear 5, which comprises the gear housing 6, and the gear cover 7 directly into the gear holder 8, without the gear housing 6 being loaded, since the gear cover 7 is not connected fixedly to the gear housing 6. If loads of this type therefore occur, the gear cover 7 attempts to move out of the gear housing 6, that is to say it would be moved out of the gear housing 6 by way of these loads. Since, however, it bears against the gear holder 8 and is supported by the latter, this is prevented by way of the gear holder 8. In this way, the loads are not introduced by the gear cover 7 into the gear housing 6, but rather directly into the gear holder 8.

Since these loads therefore do not act on the gear housing 6, they also do not act via the gear housing 6 on the first and second connecting elements V1, V2. That is to say, the force forwarding of loads of this type does not take place via these connecting elements V1, V2, in particular does not take place via the pins 14 and mounting openings 17 of the receiving pockets 15, but rather takes place via the gear cover 7 directly into the gear holder 8, in particular via its inner walls. As a result, in particular, the connecting elements V1, V2 are relieved, since they are not incorporated into the described load path. As a result, they are subject to lower wear and can be of smaller dimensions. For example, they can be configured from plastic, since they have to support only the load of the spindle drive 9, but not the loads of the moving component, in particular the vehicle seat, and any possible additionally acting loads, for example in the case of a collision.

The gear arrangement 2 advantageously comprises not only the gear holder 8 and the gear housing 6, but rather the entire gear 5, that is to say also the gear components which are arranged in the gear housing 6, in particular the worm gear and the bearing plates.

The advantages which are achieved by way of the described solution consist, in particular, in that it is made possible for the gear 5 to be manufactured as a core standard unit, by the gear housing 6 being fitted with all the required gear components, in particular with the worm gear and the bearing plates, and being closed by way of arrangement of the gear cover 7 on the gear housing 6, in particular by way of it being pressed into the gear housing 6. Subsequently, in accordance with respective requirements, a respective variant of the electric motor 3 and a respective variant of the threaded spindle 4 can be coupled to the gear 5. In order to fasten the electric motor 3, the gear housing 6 has corresponding fastening receptacles 19 which are configured, for example, as threaded bores for fastening screws. In this way, a spindle drive 9 which is adapted to respective requirements can be configured by way of this core standard unit.

Subsequently, this spindle drive 9 is connected to the gear carrier 8, by the gear housing 6 being connected to the gear carrier 8 in the above-described way. Here, the gear carrier 8 can already be fastened to the other component, in particular to the vehicle seat, or can be fastened only subsequently, that is to say when the spindle drive 9 is already connected, to this other component, in particular to the vehicle seat. As a result of the receiving openings 13 of different orientation for the fastening screws or fastening pins, the gear carrier 8 and, via this, the spindle drive 9 can be fastened in a respective required orientation to the respective variant of the vehicle seat, for example oriented in the y-direction or z-direction of the vehicle seat.

As an alternative to the above-described connecting of the gear 5 to the gear carrier 8 only after the coupling of the gear 5 to the electric motor 3 and the threaded spindle 4, a core standard preassembled group consisting of the gear 5 and the gear carrier 8 can first of all be configured, for example, by the gear 5 being manufactured first of all as a core standard unit in the way described above, by the gear housing 6 being fitted with all required gear components, in particular with the worm gear and the bearing plates, and being closed by way of arranging of the gear cover 7 on the gear housing 6, in particular by way of pressing it into the gear housing 6, and by this gear 5 subsequently being connected to the gear carrier 8 in the way described above and shown in FIGS. 3 to 5. This core standard preassembled group is identical for all variants and, depending on the requirements of the respective variant, can then be coupled to a respective variant of the electric motor 3 and a respective variant of the threaded spindle 4 and, before or after this, can be fastened by the gear carrier 8 to the other component, in particular to the vehicle seat.

LIST OF DESIGNATIONS

1 Spindle drive arrangement
2 Gear arrangement
3 Electric motor
4 Threaded spindle
5 Gear
6 Gear housing
7 Gear cover
8 Gear holder
9 Spindle drive
10 Fastening element
11 End stop sleeve
12 Thread
13 Receiving opening
14 Pin
15 Receiving pocket
16 Insertion opening
17 Mounting opening
18 Bracket
19 Fastening receptacle
A Rotational axis
K1 First component
K2 Second component
P Pivoting arrow
V1 First connecting element
V2 Second connecting element

What is claimed is:

1. A gear arrangement for a spindle drive arrangement, comprising a gear housing and a gear holder, the gear holder having at least two receiving openings receiving one fastening screw or one fastening pin for fastening to a vehicle seat, and these at least two receiving openings being oriented at a right angle and/or obliquely with respect to one another, wherein the gear housing and the gear holder have corresponding connecting elements for connecting the gear housing to the gear holder, wherein the connecting elements of the gear housing are configured as a pin, and the connecting elements of the gear holder are configured as a receiving pocket for receiving one of the pins, wherein the receiving pockets having an insertion opening and a mounting opening, and the pins are configured so that, in a mounting orientation of the gear housing with respect to the gear holder, they are inserted through the respective insertion opening and into the respective mounting opening and are rotated in the mounting opening, an insertion of the respective pin through the respective insertion opening being blocked in the case of an orientation, differing from the mounting orientation, of the gear housing with respect to the gear holder, in at least one operating orientation of the gear housing.

2. The gear arrangement as claimed in claim 1, wherein the connecting elements of the gear holder are configured as a pin, and the connecting elements of the gear housing are configured as a receiving pocket for receiving one of the pins.

3. The gear arrangement as claimed in claim 1, wherein the respective insertion opening are a slot-shaped configuration, the respective mounting opening are a round configuration, and the respective pin are a web-shaped configuration.

4. The gear arrangement as claimed in claim 3, wherein the respective pin is configured so that a length of its cross section is greater than a width of its cross section, a width of the cross section of the respective pin being smaller than a width of the respective insertion opening.

5. The gear arrangement as claimed in claim 4, wherein the length of the cross section of the respective pin is greater than the width of the respective insertion opening, and the length of the cross section of the respective pin corresponds to a diameter of the respective mounting opening.

6. The gear arrangement as claimed in claim 1, wherein the gear housing comprising a gear cover with an opening for leading through a threaded spindle.

7. The gear arrangement as claimed in claim 1, wherein an outer side of the gear cover bears against the gear holder and slides along on the gear holder during rotational movements of the gear housing relative to the gear holder in that state of the gear housing and the gear holder, in which they are connected to one another, and in an orientation, differing from the mounting orientation, of the gear housing with respect to the gear holder.

8. The gear arrangement as claimed in claim 7, wherein the gear holder, in at least one operating orientation of the gear housing with respect to the gear holder, is arranged laterally next to the gear housing exclusively in the axial direction of the threaded spindle.

9. The gear arrangement as claimed in claim 1, wherein the connecting elements of the gear housing and the connecting elements of the gear holder are arranged laterally next to the threaded spindle in at least one operating orientation of the gear housing with respect to the gear holder.

10. The gear arrangement as claimed in claim 9, wherein the connecting elements of the gear housing and the connecting elements of the gear holder are arranged laterally next to the threaded spindle in the radial direction of the threaded spindle.

11. A spindle drive arrangement, comprising a gear arrangement as claimed in claim 1.

12. A vehicle seat, comprising a spindle drive arrangement as claimed in claim 11.

13. The gear arrangement as claimed in claim 2, wherein the receiving pockets have an insertion opening and a mounting opening, and the pins are configured so that, in a mounting orientation of the gear housing with respect to the gear holder, they are inserted through the respective insertion opening and into the respective mounting opening and are rotated in the mounting opening, an insertion of the respective pin through the respective insertion opening being blocked in the case of an orientation, differing from the mounting orientation, of the gear housing with respect to the gear holder, of at least one operating orientation of the gear housing.

14. A gear arrangement for a spindle drive arrangement, comprising a gear housing and a gear holder, the gear holder having at least two receiving openings for one fastening screw or one fastening pin for fastening to a vehicle seat, and these at least two receiving openings being oriented at a right angle and/or obliquely with respect to one another,
   wherein the gear housing and the gear holder have corresponding connecting elements for connecting the gear housing to the gear holder,
   wherein the connecting elements of the gear holder are configured as a pin, and the connecting elements of the gear housing are configured as a receiving pocket for receiving one of the pins,
   wherein the receiving pockets have an insertion opening and a mounting opening, and the pins are configured so that, in a mounting orientation of the gear housing with respect to the gear holder, they are inserted through the respective insertion opening and into the respective mounting opening and are rotated in the mounting opening, an insertion of the respective pin through the respective insertion opening being blocked in the case of an orientation, differing from the mounting orientation, of the gear housing with respect to the gear holder, in at least one operating orientation of the gear housing.

\* \* \* \* \*